(12) United States Patent
Chiang (10) Patent No.: US 11,970,024 B2
(45) Date of Patent: Apr. 30, 2024

(54) WHEEL TRACTION DEVICE

(71) Applicant: Chin-Fu Chiang, Tainan (TW)

(72) Inventor: Chin-Fu Chiang, Tainan (TW)

( * ) Notice: Subject to any disclaimer, the term of this patent is extended or adjusted under 35 U.S.C. 154(b) by 889 days.

(21) Appl. No.: 17/017,272

(22) Filed: Sep. 10, 2020

(65) Prior Publication Data

US 2021/0362555 A1 Nov. 25, 2021

(30) Foreign Application Priority Data

May 22, 2020 (TW) .................................. 109206314

(51) Int. Cl.
*B60B 39/12* (2006.01)
*B60B 39/00* (2006.01)
*B60C 27/02* (2006.01)
*B60C 27/04* (2006.01)

(52) U.S. Cl.
CPC .............. *B60B 39/12* (2013.01); *B60B 39/00* (2013.01); *B60C 27/0269* (2013.01); *B60C 27/04* (2013.01)

(58) Field of Classification Search
CPC ..... B60B 39/00; B60B 39/12; B60C 27/0269; B60C 27/04
See application file for complete search history.

(56) References Cited

U.S. PATENT DOCUMENTS 4,223,835 A * 9/1980 Witt ........................ B60B 39/12
238/14

* cited by examiner

*Primary Examiner* — Robert J McCarry, Jr.
(74) *Attorney, Agent, or Firm* — Dykema Gossett PLLC (57) ABSTRACT

A wheel traction device is adapted for providing traction for a wheel of a vehicle to escape from a mud ground during rotation of the wheel, and includes: a guiding unit having a guiding portion adapted to abut against the wheel; a bearing unit that is detachably connected to the guiding unit, and that has a bearing portion adapted to be positioned on the mud ground such that, during rotation of the wheel, the bearing unit and the guiding unit are prevented from being driven by the rotation of the wheel to move relative to the mud ground, thereby allowing the wheel to roll over the bearing portion under guidance of the guiding portion; and a fastening unit that detachably fastens the bearing and guiding units together.

14 Claims, 6 Drawing Sheets

WHEEL TRACTION DEVICE

CROSS-REFERENCE TO RELATED APPLICATION

This application claims priority to Taiwanese Utility Model Patent Application No. 109206314, filed on May 22, 2020.

FIELD

The disclosure relates to a traction device, and more particularly to a wheel traction device that provides traction for a vehicle to escape from a mud ground.

BACKGROUND

A conventional wheel traction device such as a tire traction mat is used for providing a vehicle with increased traction to escape from a soft ground (e.g., mud ground, sand, snow, etc.). Typically, a conventional wheel traction device has an elongated board body and a plurality of anti-slip protrusions protruding from the plate/board body. During use, the conventional wheel traction device is placed in front of a wheel of the vehicle that is stuck in the soft ground, and when the wheel rotates, the device will provide traction and support to help the wheel roll thereover and escape the soft ground.

However, since such a conventional wheel traction device is integrally formed as one piece, when any part of the device is damaged, the entire device is compromised, which is rather uneconomical. Moreover, since the device is made of a single material, often metal or plastic, it is either too heavy and costly (when it is made of metal), or not strong and durable enough (when it is made of plastic) to withstand the weight of the vehicle or the pulling forces exerted by the wheel.

SUMMARY

Therefore, the object of the disclosure is to provide a wheel traction device that can alleviate at least one of the drawbacks of the prior art.

According to the disclosure, a wheel traction device is adapted for providing traction for a wheel of a vehicle to escape from a mud ground in a first direction during rotation of the wheel. The wheel traction device includes a guiding unit, a bearing unit and a fastening unit.

The guiding unit is adapted to be disposed on the mud ground, and includes a guiding portion that is adapted to abut against the wheel prior to the rotation of the wheel.

The bearing unit is detachably connected to the guiding unit, and has a bearing portion that is disposed downstream of the guiding unit in the first direction, and that is adapted to be positioned on the mud ground such that, during rotation of the wheel, the bearing unit and the guiding unit are prevented from being driven by the rotation of the wheel to move relative to the mud ground, thereby allowing the wheel to roll over the bearing portion of the bearing unit under guidance of the guiding portion of the guiding unit.

The fastening unit detachably fastens the bearing unit and the guiding unit together to secure connection therebetween.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
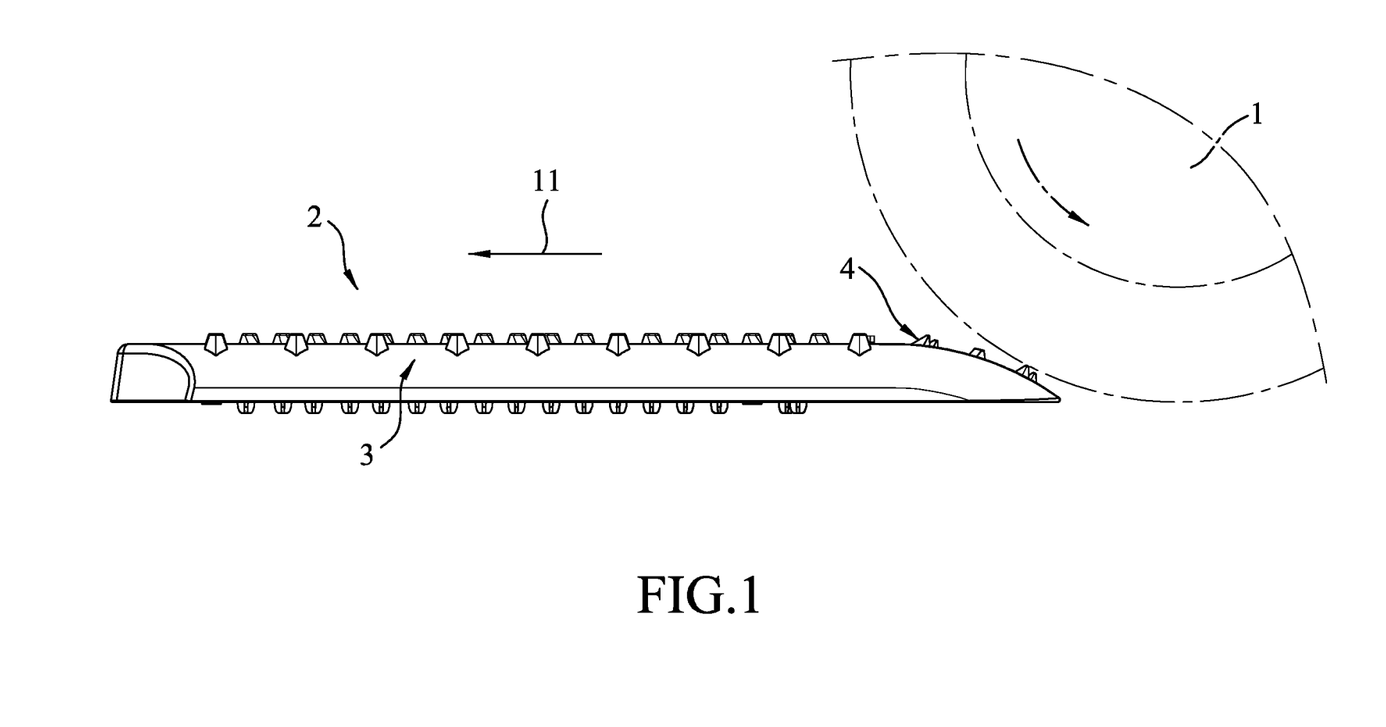
FIG. 1 is a side view illustrating an embodiment of a wheel traction device according to the disclosure and a part of a wheel of a vehicle.
Figure 2:
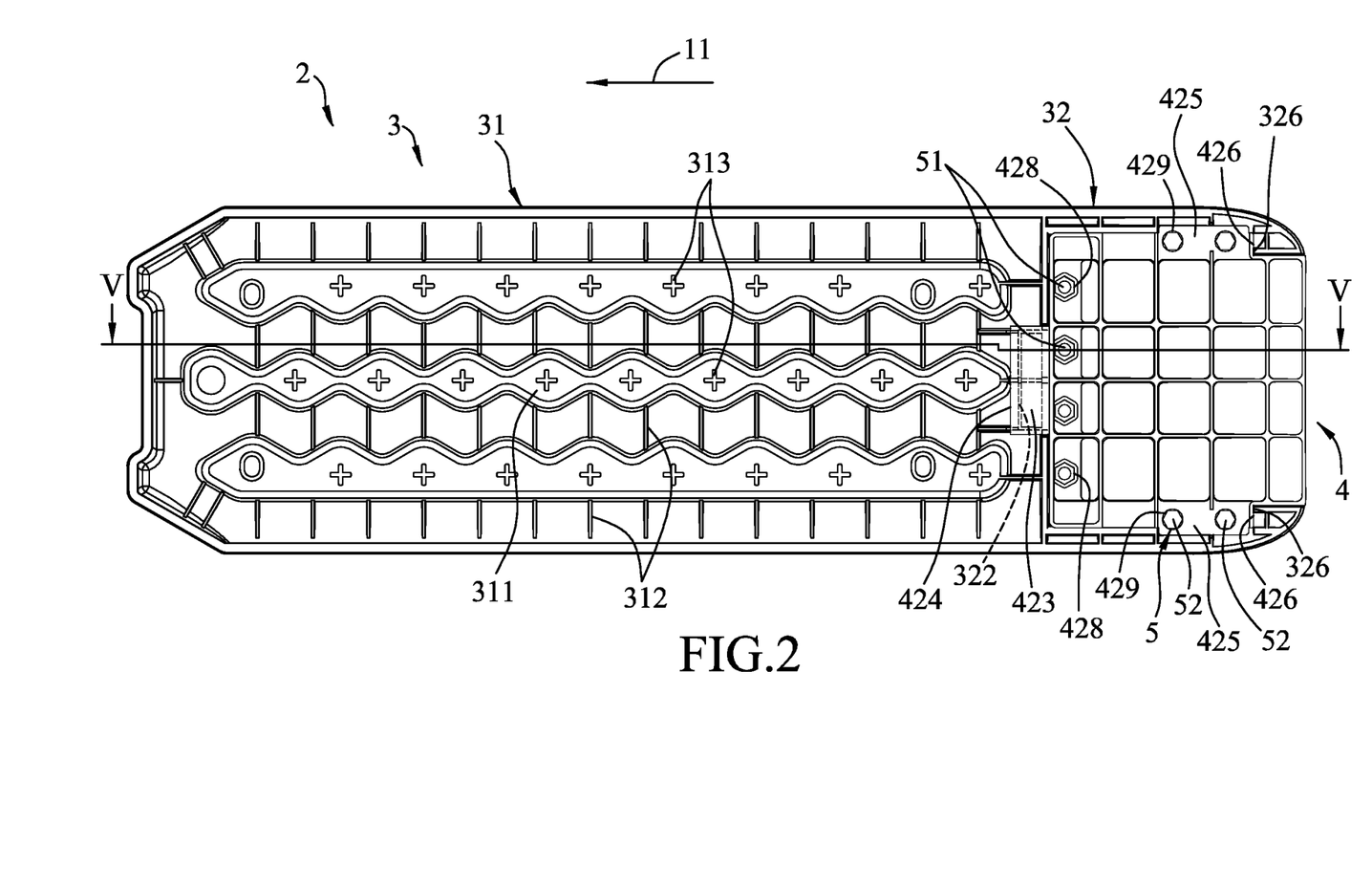
FIG. 2 is a bottom view of the embodiment.
Figure 3:
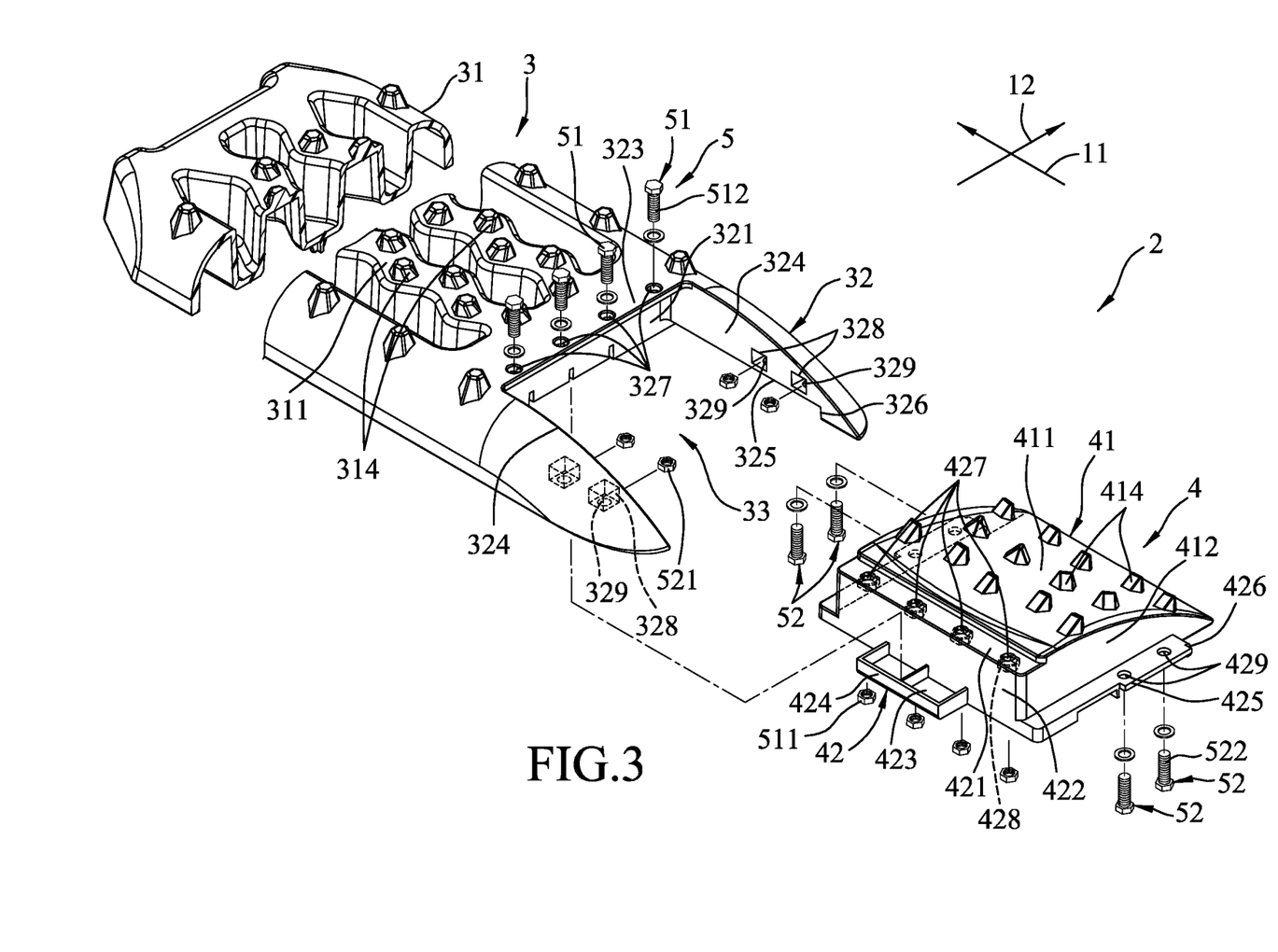
FIG. 3 is a fragmentary and exploded perspective view of the embodiment.
Figure 4:
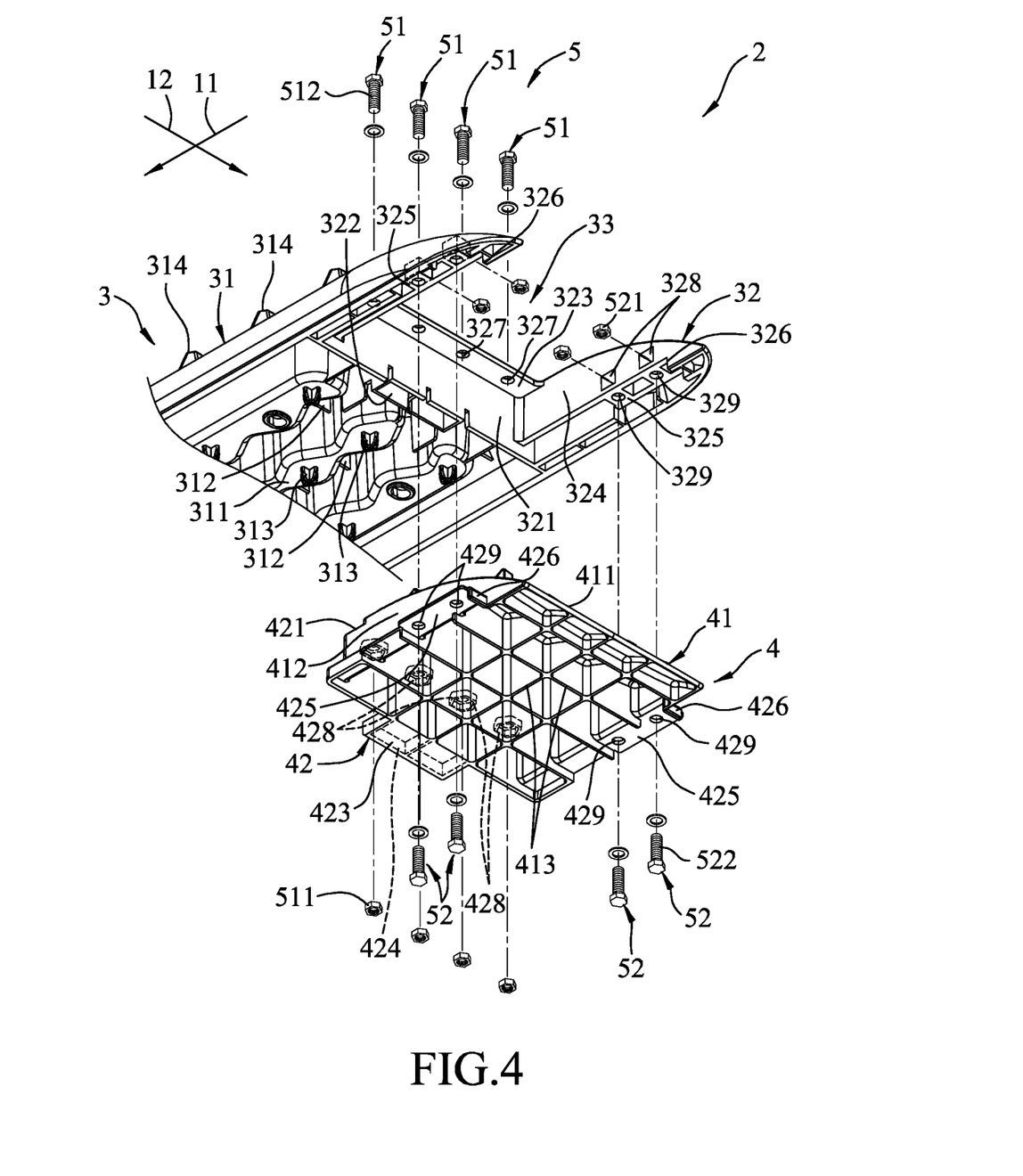
FIG. 4 is another fragmentary and exploded perspective view of the embodiment.
Figure 5:
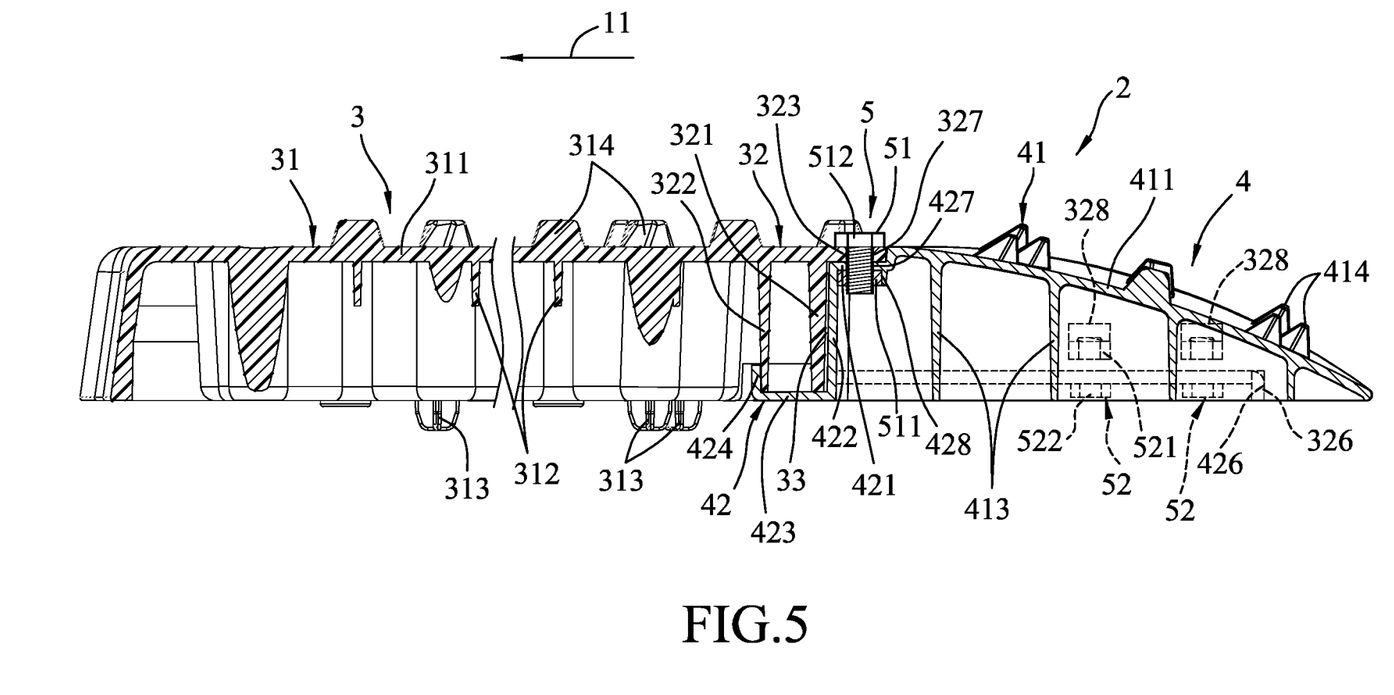
FIG. 5 is a fragmentary sectional view taken along line V-V in FIG. 2.
Figure 6:
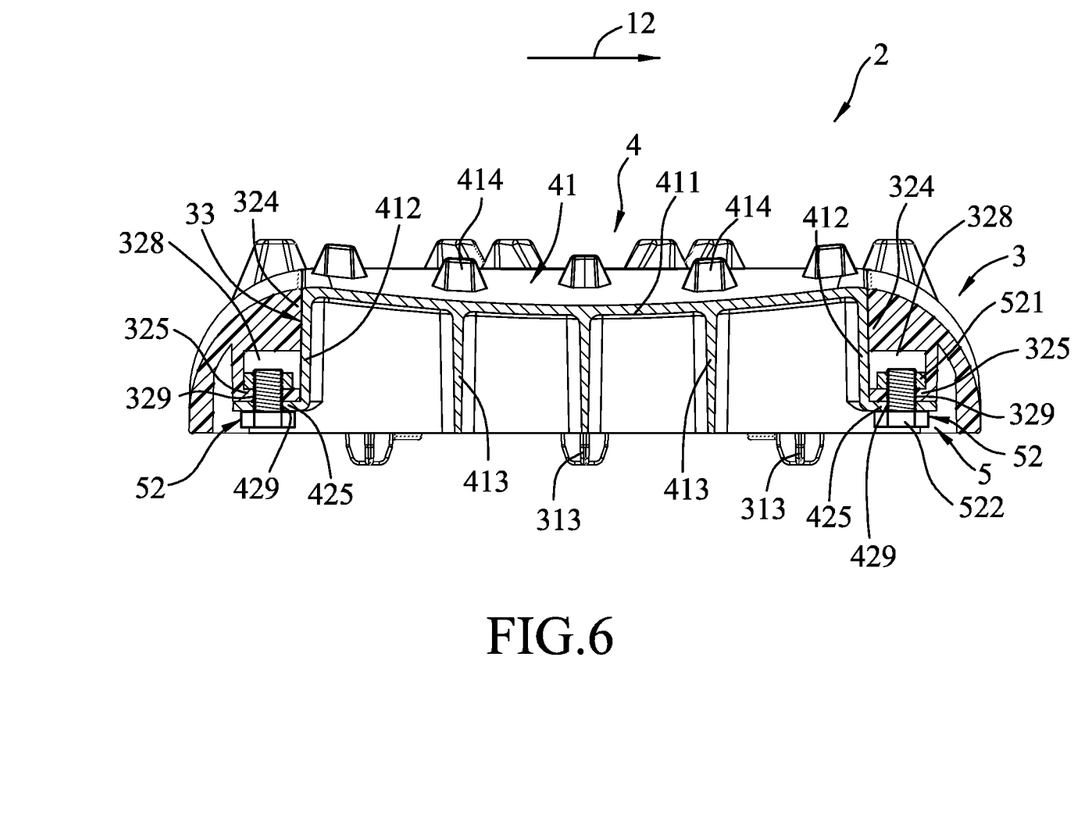
FIG. 6 is a sectional view of the embodiment.

Referring to FIGS. 1, 2 and 3, an embodiment of a wheel traction device 2 according to the disclosure is adapted for providing traction for a wheel 1 of a vehicle to escape from a mud ground in a first direction 11 during rotation of the wheel 1. The wheel traction device 2 includes a guiding unit 4, a bearing unit 3 and a fastening unit 5.

The guiding unit 4 is adapted to be disposed on the mud ground, and includes a guiding portion 41 that is adapted to abut against the wheel 1 prior to the rotation of the wheel 1.

The bearing unit 3 is detachably connected to the guiding unit 4, and has a bearing portion 31 that is disposed downstream of the guiding unit 4 in the first direction 11 and that is adapted to be positioned on the mud ground such that, during rotation of the wheel 1, the bearing unit 3 and the guiding unit 4 are prevented from being driven by the rotation of the wheel 1 to move relative to the mud ground, thereby allowing the wheel 1 to roll over the bearing portion 31 of the bearing unit 3 under guidance of the guiding portion 41 of the guiding unit 4.

The fastening unit 5 detachably fastens the bearing unit 3 and the guiding unit 4 together to secure the connection therebetween.

Specifically, referring to FIGS. 3 to 6, the bearing unit 3 is made of plastic, is integrally formed as one piece, and has the bearing portion 31 and a U-shaped first connecting portion 32.

The bearing portion 31 of the bearing unit 3 has a main wall 311, a plurality of reinforcing ribs 312, a plurality of bottom protrusions 313 and a plurality of top protrusions 314.

The main wall 311 has a cross-section that is perpendicular to the first direction 11 and that has a wavy contour, and is adapted to be disposed on the mud ground. The reinforcing ribs 312 are connected to a bottom surface of the main wall 311 for structural strengthening. The bottom protrusions 313 are formed at a bottom end of the bearing portion 31, and are adapted to extend into the mud ground so that the main wall 311 and the bottom protrusions 313 can cooperatively provide the bearing unit 3 with a firm grip on the mud ground. The top protrusions 314 are formed at a top end of the bearing portion 31, and are adapted to extend into a tread of the wheel 1 to prevent the wheel 1 from slipping.

The first connecting portion 32 of the bearing unit 3 is connected to the bearing portion 31, defines a receiving space 33 with its U-shaped structure, and has a first dividing wall 321, a first linking wall 323, two first side upright walls 324, a first blocking wall 322, two first side blocking walls 326 and two first side linking walls 325.

The first dividing wall 321 is connected to the main wall 311 of the bearing portion 31, and extends in a second direction 12 that is transverse to the first direction 11 and that is substantially parallel to the mud ground. In the present embodiment, the second direction 12 is perpendicular to the first direction 11.

The first linking wall 323 is connected to the top end of the first dividing wall 321, is adapted to extend parallel to the mud ground in the second direction 12, and is formed with four first through holes 327 that are in spatial communication with the receiving space 33, and that are arranged in the second direction 12.

The first side upright walls 324 extend in the first direction 11, are disposed respectively at opposite sides of the receiving space 33 in the second direction 12, and are connected to the first dividing wall 321. Each of the first side upright walls 324 is formed with two side slots 328 that are in spatial communication with the receiving space 33, that are arranged in the first direction 11, and that are non-circular (e.g., rectangular or hexagonal). In the present embodiment, the side slots 328 are rectangular.

The first blocking wall 322 extends in the second direction 12, is disposed under and connected to the main wall 311 of the bearing portion 31, and is parallel to and spaced apart from the first dividing wall 321 in the first direction 11.

The first side blocking walls 326 are disposed respectively at the opposite sides of the receiving space 33 in the second direction 12, and each of the first side blocking walls 326 is adapted to extend from a bottom end of a respective one of the first side upright walls 324 toward the mud ground.

Each of the first side linking walls 325 is transversely connected to the bottom end of a respective one of the first side upright walls 324, is connected to a respective one of the first side blocking walls 326, and is formed with two first punch holes 329. The first punch holes 329 of each of the first side linking walls 325 are respectively in spatial communication with the side slots 328 of the respective one of the first side upright walls 324.

The guiding unit 4 is made of metal, is integrally formed as one piece, and has the guiding portion 41 and a second connecting portion 42.

The guiding portion 41 of the guiding unit 4 engages the receiving space 33 of the bearing unit 3, and has a top abutment wall 411, two side walls 412, a plurality of reinforcing plates 413 and a plurality of guiding protrusions 414.

The top abutment wall 411 is adapted to descend in a direction opposite to the first direction 11 relative to the mud ground (see FIG. 1), and has an elongated middle section that is indented (see FIG. 6) and that extends substantially in the first direction 11. It should be noted that the indented middle section of the top abutment wall 411 corresponds in shape with the wheel 1 such that it assists the wheel 1 in rolling over the top abutment wall 411 toward the bearing portion 31 of the bearing unit 3.

The side walls 412 are respectively connected to opposite ends of the top abutment surface 411 in the second direction 12, and are adapted to extend downwardly toward the mud ground. Each of the side walls 412 abuts against a respective one of the first side upright walls 324 of the first connecting portion 32 of the bearing unit 3.

The reinforcing plates 413 are disposed under and connected to the top abutment wall 411, and are disposed between and connected to the side walls 412. The side walls 412 and the reinforcing plates 413 cooperatively provide the guiding unit 4 with a firm grip on the mud ground.

The guiding protrusions 414 protrude from the top abutment wall 411 and are adapted to extend into the tread of the wheel 1 to prevent the wheel 1 from slipping. Overall, the main wall 311 and the top and bottom protrusions 314, 313 of the bearing unit 3, and the side walls 412, the reinforcing plates 413 and the guiding protrusions 414 of the guiding unit 4 are adapted to cooperatively provide traction between the wheel 1 and the mud ground during the rotation of the wheel 1.

The second connecting portion 42 of the guiding unit 4 is connected to a periphery of the guiding portion 41, is detachably connected to the first connecting portion 32 of the bearing unit 3, and has a second linking wall 421, a second dividing wall 422, an extending wall 423, a second blocking wall 424, two second side linking walls 425 and two second side blocking walls 426.

The second linking wall 421 abuts against the first linking wall 323, and is formed with four second through holes 427 and four main slots 428. The second through holes 427 are registered respectively with the first through holes 327 of the first linking wall 323 of the bearing unit 3. The main slots 428 extend through a bottom surface of the second linking wall 421, are respectively in spatial communication with the second through holes 427, and are non-circular (e.g., rectangular or hexagonal). In the present embodiment, the main slots 428 are hexagonal.

The second dividing wall 422 is transversely connected to an end of the second linking wall 421 that is proximate to the first dividing wall 321 of the guiding unit 3, is connected between the side walls 412 in the second direction 12, and is adapted to extend downwardly toward the mud ground.

The extending wall 423 extends from a bottom end of the second dividing wall 422 in the first direction 11, and is disposed under the first dividing wall 321 and the first blocking wall 322 of the bearing unit 3.

The second blocking wall 424 extends in the second direction 12, is transversely connected to an end of the extending wall 423 that is distal from the second dividing wall 422, and is disposed downstream of the first blocking wall 322 of the bearing unit 3 in the first direction 11 such that the first blocking wall 322 prevents movement of the second blocking wall 424 relative to the bearing unit 3 in the direction opposite to the first direction 11.

The second side linking walls 425 are opposite to each other in the second direction 12, and are connected respectively and transversely to bottom ends of the side walls 412. Each of the second side linking walls 425 abuts against a respective one of the first side linking walls 325, and is formed with two second punch holes 429 that are registered respectively with the first punch holes 329 of the respective one of the first side linking walls 325.

The second side blocking walls 426 are disposed opposite to each other in the second direction 12, and are connected respectively and transversely to the second side linking walls 425. Each of the second side blocking walls 426 is disposed downstream of a respective one of the first side blocking walls 326 in the first direction 11, such that the first side blocking walls 326 prevent movement of the second side blocking walls 426 relative to the bearing unit 3 in the direction opposite to the first direction 11.

The fastening unit 5 includes four main fastening groups 51 that fasten the first linking wall 323 and the second linking wall 421 together, and four side fastening groups 52 that fasten the first side linking walls 325 and the second side linking walls 425 together. Each of the main fastening groups 51 has a main bolt 512 and a main nut 511, and each of the side fastening groups 52 has a side bolt 522 and a side nut 521.

For each of the main fastening groups 51, the main bolt 512 extends through a respective one of the first through holes 327 and the respective one of the second through holes 427, and the main nut 511 is disposed in a respective one of the main slots 428 and is threadedly engaged with the main bolt 512 for securing the first linking wall 323 and the second linking wall 421 together.

For each of the side fastening groups 52, the side bolt 522 extends through a corresponding one of the second punch holes 429 of a corresponding one of the second side linking wall 425 and the respective one of the first punch holes 329 that is registered with the corresponding one of the second punch holes 429, and the side nut 521 is disposed in a respective one of the side slots 328 and is threadedly engaged with the side bolt 522 for securing the corresponding first linking wall 325 and the corresponding second side linking wall 425 together.

It should be noted that, in the present embodiment, the main nut 511 of each of the main fastening groups 51 is hexagonal and is retained non-rotatably in the respective one of the main slots 428. The side nut 521 of each of the side fastening groups 52 is hexagonal and is retained non-rotatably in the respective one of the side slots 328. The main bolts 512 and the side bolts 522 are screwed in opposite directions (i.e., downwardly and upwardly). However, this disclosure is not limited to the aforementioned configurations of the present embodiment. For example, in other embodiments of the disclosure, the main nuts 511 and the side nuts 521 may be rectangular, and the main bolts 512 and the side bolts 522 may be screwed in other directions.

It should also be noted that, in other embodiments of the disclosure, the numbers of the first through holes 327, the second through holes 427, the main slots 428 and the main fastening groups 51 are the same, but not limited to four. Similarly, for each side of the U-shaped first connecting portion 32 of the bearing unit 3, the numbers of the side slots 328, the first punch holes 329, the second punch holes 429 and the side fastening groups 52 are the same, but not limited to two in other embodiments.

Referring again to FIG. 1, in practical applications, the wheel traction device 2 is disposed on the mud ground, with the guiding portion 41 of the guiding unit 4 abutting against the wheel 1 that is stuck in the mud ground.

When the wheel 1 is driven to rotate, it rolls over the bearing portion 31 of the bearing unit 3 under guidance of the guiding portion 41 of the guiding unit 4, and in turn escapes from the mud ground. It should be noted that when the wheel 1 is climbing up the guiding portion 41 of the guiding unit 4, it exerts a pulling force on the guiding unit 4 in a direction opposite to the first direction 11; meanwhile, the first blocking wall 322 and the first side blocking walls 326 of the bearing unit 3 and the fastening unit 5 cooperatively prevent the guiding unit 4 from moving in the direction opposite to the first direction 11, and prevent the guiding unit 4 from becoming detached from the bearing unit 3.

In summary, compared with the prior art, the wheel traction device 2 of the present embodiment according to the disclosure has the following advantages.

By virtue of the aforementioned disposition of the fastening unit 5 and configurations of the bearing unit 3 and the guiding unit 4, the connection between the bearing unit 3 and the guiding unit 4 is secured, enabling the wheel traction device 2 to withstand the pulling force exerted by the wheel 1.

In addition, since the bearing unit 3 and the guiding units 4 are detachable from each other and secured together by the fastening unit 5, when the guiding unit 4, which often endures greater stress than does the bearing unit 3, is damaged, it can be replaced alone without discarding other components, which is more economical than the prior art.

Moreover, since the wheel traction device 2 of the present embodiment includes the use of both plastic (i.e., the bearing unit 3) and metal (i.e., the guiding unit 4), it benefits from the properties of the two mentioned materials. Therefore, it is stronger than the conventional all-plastic wheel traction device, and lighter than the conventional all-metal wheel traction device.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A wheel traction device adapted for providing traction for a wheel of a vehicle to escape from a mud ground in a first direction during rotation of the wheel, said wheel traction device comprising:
   a guiding unit adapted to be disposed on the mud ground, and including a guiding portion that is adapted to abut against the wheel prior to the rotation of the wheel;
   a bearing unit detachably connected to said guiding unit, and having a bearing portion that is disposed downstream of said guiding unit in the first direction, and that is adapted to be positioned on the mud ground such that, during rotation of the wheel, said bearing unit and said guiding unit are prevented from being driven by the rotation of the wheel to move relative to the mud ground, thereby allowing the wheel to roll over said bearing portion of said bearing unit under guidance of said guiding portion of said guiding unit; and
   a fastening unit detachably fastening said bearing unit and said guiding unit together to secure connection therebetween;
   wherein said bearing unit is made of plastic and is integrally formed as one piece, and said guiding unit is made of metal and is integrally formed as one piece;
   wherein said bearing unit further has a U-shaped first connecting portion that is connected to said bearing portion, that defines a receiving space, and that has a first blocking wall extending in a second direction which is transverse to the first direction and which is substantially parallel to the mud ground; and
   wherein guiding unit engages said receiving space, and further has a second connecting portion that is connected to a periphery of said guiding portion, that is detachably connected to said first connecting portion of said bearing unit, and that has a second blocking wall extending in the second direction, said second blocking wall being disposed downstream of said first blocking wall of said bearing unit in the first direction such that said first blocking wall prevents movement of said second blocking wall relative to said bearing unit in a direction opposite to the first direction.

2. The wheel traction device as claimed in claim 1, wherein:
said first connecting portion of said bearing unit further has two first side blocking walls that are disposed respectively at opposite sides of said receiving space in the second direction; and
said second connecting portion of said guiding unit further has two second side blocking walls that are opposite to each other in the second direction, and each of said second side blocking walls is disposed downstream of a respective one of said first side blocking walls in the first direction, such that said first side blocking walls prevent movement of said second side blocking walls relative to said bearing unit in the direction opposite to the first direction.

3. The wheel traction device as claimed in claim 2, wherein:
said first connecting portion of said bearing unit further has a first linking wall that extends in the second direction, and that is formed with a plurality of first through holes;
said second connecting portion of said guiding unit further has a second linking wall that abuts against said first linking wall, and that is formed with a plurality of second through holes registered respectively with said first through holes; and
said fastening unit includes a plurality of main fastening groups, each of said main fastening groups having a main bolt that extends through a respective one of said first through holes and a respective one of said second through holes, and a main nut that is threadedly engaged with said main bolt for securing said first and second linking walls together.

4. The wheel traction device as claimed in claim 3, wherein said second linking wall of said guiding unit is further formed with a plurality of main slots that are respectively in spatial communication with said second through holes, said main nut of each of said main fastening groups being retained non-rotatably in a respective one of said main slots.

5. The wheel traction device as claimed in claim 3, wherein:
said first connecting portion of said bearing unit further has two first side upright walls that are disposed respectively at said opposite sides of said receiving space in the second direction, and two first side linking walls, each of said first side linking walls being connected to a respective one of said first side blocking walls, being transversely connected to a respective one of said first side upright walls, and being formed with a plurality of first punch holes;
said second connecting portion of said guiding unit further has two second side linking walls that are opposite to each other in the second direction, and each of said second side linking walls abuts against a respective one of said first side linking walls, and is formed with a plurality of second punch holes which are registered respectively with said first punch holes of said respective one of said first side linking walls; and said fastening unit further includes a plurality of side fastening groups, each of said side fastening groups having a side bolt that extends through a corresponding one of said second punch holes of a corresponding one of said second side linking walls and a corresponding one of said first punch holes of a corresponding one of said first linking walls, and a side nut that is threadedly engaged with said side bolt for securing the corresponding one of said first linking walls and the corresponding one of said second side linking walls together.

6. The wheel traction device as claimed in claim 5, wherein each of said first side upright walls of said bearing unit is formed with a plurality of side slots that are in spatial communication with said receiving space, and that are respectively in spatial communication with said first punch holes of a respective one of said first side linking walls, said side nut of each of said side fastening groups being retained non-rotatably in a respective one of said side slots.

7. The wheel traction device as claimed in claim 6, wherein said guiding portion of said guiding unit has:
a top abutment wall that is adapted to descend in the direction opposite to the first direction relative to the mud ground, and that has an elongated middle section being indented and extending substantially in the first direction; and
two side walls that are respectively connected to opposite ends of said top abutment surface in the second direction, each of said side walls abutting against a respective one of said first side upright walls of said first connecting portion of said bearing unit, and connected to a respective one of said second side linking walls of said second connecting portion of said guiding unit.

8. The wheel traction device as claimed in claim 7, wherein:
said bearing portion of said bearing unit has a top end formed with a plurality of top protrusions, and a bottom end formed with a plurality of bottom protrusions; and
said guiding portion of said guiding unit further has a plurality of guiding protrusions protruding from said top abutment wall, said top and bottom protrusions of said bearing unit and said guiding protrusions of said guiding unit being adapted to cooperatively provide traction between the wheel and the mud ground during the rotation of the wheel.

9. The wheel traction device as claimed in claim 1, wherein:
said first connecting portion of said bearing unit further has a first linking wall that extends in the second direction, and that is formed with a plurality of first through holes;
said second connecting portion of said guiding unit further has a second linking wall that abuts against said first linking wall, and that is formed with a plurality of second through holes registered respectively with said first through holes; and
said fastening unit includes a plurality of main fastening groups, each of said main fastening groups having a main bolt that extends through a respective one of said first through holes and a respective one of said second through holes, and a main nut that is threadedly engaged with said main bolt for securing said first and second linking walls together.

10. The wheel traction device as claimed in claim 9, wherein said second linking wall of said guiding unit is further formed with a plurality of main slots that are respectively in spatial communication with said second through holes, said main nut of each of said main fastening groups being retained non-rotatably in a respective one of said main slots.

11. The wheel traction device as claimed in claim 9, wherein:
said first connecting portion of said bearing unit further has two first side upright walls that are disposed respectively at said opposite sides of said receiving space in the second direction, and two first side linking walls, each of said first side linking walls being transversely connected to a respective one of said first side upright walls and formed with a plurality of first punch holes;
said second connecting portion of said guiding unit further has two second side linking walls that are opposite to each other in the second direction, each of said second side linking walls abutting against a respective one of said first side linking walls, and being formed with a plurality of second punch holes which are registered respectively with said first punch holes of said respective one of said first side linking walls; and
said fastening unit further includes a plurality of side fastening groups, each of said side fastening groups having a side bolt that extends through a corresponding one of said second punch holes of a corresponding one of said second side linking walls and a corresponding one of said first punch holes of a corresponding one of said first linking walls, and a side nut that is threadedly engaged with said side bolt for securing the corresponding one of said first linking walls and the corresponding one of said second side linking walls together.

12. The wheel traction device as claimed in claim 11, wherein each of said first side upright walls of said bearing unit is formed with a plurality of side slots that are in spatial communication with said receiving space, and that are respectively in spatial communication with said first punch holes of a respective one of said first side linking walls, said side nut of each of said side fastening groups being retained non-rotatably in a respective one of said side slots.

13. The wheel traction device as claimed in claim 12, wherein said guiding portion of said guiding unit has:
a top abutment wall that is adapted to descend in the direction opposite to the first direction relative to the mud ground, and that has an elongated middle section being indented and extending substantially in the first direction; and
two side walls that are respectively connected to opposite ends of said top abutment surface in the second direction, each of said side walls abutting against a respective one of said first side upright walls of said first connecting portion of said bearing unit, and connected to a respective one of said second side linking walls of said second connecting portion of said guiding unit.

14. The wheel traction device as claimed in claim 13, wherein:
said bearing portion of said bearing unit has a top end formed with a plurality of top protrusions, and a bottom end formed with a plurality of bottom protrusions; and
said guiding portion of said guiding unit further has a plurality of guiding protrusions protruding from said top abutment wall, said top and bottom protrusions of said bearing unit and said guiding protrusions of said guiding unit being adapted to cooperatively provide traction between the wheel and the mud ground during the rotation of the wheel.

* * * * *